United States Patent
Zhang et al.

(10) Patent No.: US 9,641,729 B2
(45) Date of Patent: May 2, 2017

(54) SYSTEM AND METHOD FOR ENCODER-INTEGRATED MEDIA DENOISING

(71) Applicant: FutureWei Technologies, Inc., Plano, TX (US)

(72) Inventors: Dong-Qing Zhang, Plainsboro, NJ (US); Bo Wang, College Station, TX (US); Hong Heather Yu, West Windsor, NJ (US); Jianyu Zhang, Santa Clara, CA (US)

(73) Assignee: Futurewei Technologies, Inc., Plano, TX (US)

( * ) Notice: Subject to any disclaimer, the term of this patent is extended or adjusted under 35 U.S.C. 154(b) by 459 days.

(21) Appl. No.: 13/871,965

(22) Filed: Apr. 26, 2013

(65) Prior Publication Data
US 2013/0286288 A1    Oct. 31, 2013

Related U.S. Application Data

(60) Provisional application No. 61/638,882, filed on Apr. 26, 2012.

(51) Int. Cl.
*H04N 5/213* (2006.01)
*H04N 19/117* (2014.01)
(Continued)

(52) U.S. Cl.
CPC .......... *H04N 5/213* (2013.01); *H04N 19/117* (2014.11); *H04N 19/154* (2014.11); *H04N 19/176* (2014.11); *H04N 19/86* (2014.11)

(58) Field of Classification Search
CPC .... H04N 5/213; H04N 19/117; H04N 19/154; H04N 19/176
(Continued)

(56) References Cited

U.S. PATENT DOCUMENTS

| | | | |
|---|---|---|---|
| 8,884,949 B1 * | 11/2014 | Lambert et al. | 345/419 |
| 2010/0195926 A1 * | 8/2010 | Sasaki | 382/260 |

(Continued)

OTHER PUBLICATIONS

Elad, M., "On the Origin of the Bilateral Filter and Ways to Improve It," IEEE Transactions on Image Processing, vol. 11, No. 10, Oct. 2002, pp. 1141-1151.

Guo, L. et al., "An Encoder-Embedded Video Denoising Filter Based on the Temporal LMMSE Estimator," IEEE International Conference on Multimedia and Expo, Jul. 9-12, 2006, pp. 841-844.

(Continued)

*Primary Examiner* — William C Vaughn, Jr.
*Assistant Examiner* — Jae N Noh
(74) *Attorney, Agent, or Firm* — Slater Matsil, LLP

(57) ABSTRACT

Embodiments are provided herein to achieve video or image sequence encoding with an improved denoising algorithm that is both efficient computationally and has acceptable overhead cost in comparison to other denoising schemes for video encoding. The embodiments include using recursive bilateral filtering as part of the denoising algorithm, which is integrated into a video encoder to overcome limitations of other encoder-integrated denoising algorithms. An embodiment method includes receiving, at a filtering and residual computation function at the encoder, a macro block comprising a plurality of pixels. The filtering and residual computation function also receives, from a motion estimation function at the encoder, a reference block. The reference block comprises a plurality of reference pixels corresponding to the macro block. The filtering and residual computation function further applies a recursive bilateral filter function to each of the pixels of the macro block using the reference pixels of the reference block.

24 Claims, 3 Drawing Sheets

(51) Int. Cl.
*H04N 19/154* (2014.01)
*H04N 19/176* (2014.01)
*H04N 19/86* (2014.01)

(58) Field of Classification Search
USPC .................................................. 375/240.27
See application file for complete search history.

(56) References Cited

U.S. PATENT DOCUMENTS

| | | | |
|---|---|---|---|
| 2012/0081553 A1* | 4/2012 | Cote | H04N 9/045 348/207.1 |
| 2012/0194642 A1* | 8/2012 | Lie et al. | 348/43 |
| 2012/0300996 A1* | 11/2012 | Nakamura | G06K 9/0014 382/128 |
| 2014/0078347 A1* | 3/2014 | DeBattista | 348/241 |

OTHER PUBLICATIONS

Guo, L. et al., "Integration of Recursive Temporal LMMSE Denoising Filter into Video Codec," IEEE Transactions on Circuits and Systems for Video Technology, vol. 20, No. 2, Feb. 2010, pp. 236-249.

Scharr, H. et al., "Image Statistics and Anisotropic Diffusion," Proceedings of the Ninth IEEE International Conference on Computer Vision, Oct. 13-16, 2003, pp. 1-8.

Song, B.C. et al., "Motion-compensated temporal filtering for denoising in video encoder," Electronics Letters, vol. 40, No. 13, Jun. 24, 2004, 2 pages.

Tomasi, C. et al. "Bilateral Filtering for Gray and Color Images," Sixth International Conference on Computer Vision, Bombay, India, Jan. 4-7, 1998 pp. 839-846.

Van Roosmalen, P.M.B. et al., "Embedded Coring in MPEG Video Compression," IEEE Transactions on Circuits and Systems for Video Technology, vol. 12, No. 3, Mar. 2002, pp. 205-211.

Zhang, D.-Q. et al., "Recursive Bilateral Filter for Encoder-Integrated Video Denoising," IEEE Visual Communications and Image Processing (VCIP), Nov. 27-30, 2012, 6 pages.

* cited by examiner

SYSTEM AND METHOD FOR ENCODER-INTEGRATED MEDIA DENOISING

This application claims the benefit of U.S. Provisional Application No. 61/638,882 filed on Apr. 26, 2012 by Dong-Qing Zhang et al. and entitled "System and Method for Encoder-Integrated Media Denoising," which is hereby incorporated herein by reference as if reproduced in its entirety.

TECHNICAL FIELD

The present invention relates to the field of video encoding and processing, and, in particular embodiments, to a system and method for recursive bilateral filter for encoder-integrated real-time video denoising.

BACKGROUND

Video noise reduction is an important component in modern video encoding architecture, and video denoising (or noise removing) can significantly improve video quality and video compression efficiency for video encoding. The algorithms of video denoising can be classified into three categories: spatial, temporal, and spatiotemporal. Spatial denoising algorithms use pixels within the current input frame, and therefore do not require motion estimation. But this category of algorithms has the tendency of blurring details, especially in texture rich areas. Temporal denoising algorithms use the temporal neighbors of the processing pixel. Because of object or background motion, temporal denoising requires motion estimation to align the pixels before filtering. The motion estimation is often more expensive in computation than denoising itself. However, temporal denoising algorithms generally perform much better at preserving details compared to spatial denoising algorithms, and therefore are widely used for real-world applications. Spatiotemporal algorithms use both spatial and temporal neighbors, and therefore may be more expensive compared to the other two methodologies. Denoising before video encoding is effective to enhance video quality and improve coding efficiency. But denoising is a substantially computational intensive process. Multiple pre-coding denoising algorithms are implemented with hardware, such as FPGA or ASIC, for real-time implementation. There is a need for an improved denoising algorithm that is both highly effective and significantly efficient computationally at an acceptable or reduced cost.

SUMMARY OF THE INVENTION

In accordance with an embodiment, a method for removing noise in a video or image sequence includes receiving, at an encoder, a current frame comprising a plurality of current pixels and a previous frame comprising a plurality of previous pixels corresponding to the current pixels. The encoder computes, for each current pixel of the current pixels, a similarity term for bilateral filtering using the previous pixels and applies a recursive bilateral filter to each current pixels using the similarity term for bilateral filtering.

In accordance with another embodiment, a method for removing noise in a video or image sequence includes receiving, at a filtering and residual computation function at an encoder, a macro block in a video or image sequence, the macro block comprising a plurality of pixels. The filtering and residual computation function also receives, from a motion estimation function at the encoder, a reference block. The reference block comprises a plurality of reference pixels corresponding to the pixels of the macro block. The filtering and residual computation function further applies a recursive bilateral filter function to each of the pixels of the macro block using a corresponding pixel of the reference block.

In accordance with another embodiment, an apparatus for removing noise in a video or image sequence includes a processor and a computer readable storage medium storing programming for execution by the processor. The programming includes instructions to receive, at a combined filtering and residual computation module implemented as part of an encoder, a frame comprising a plurality of pixels and a previous frame comprising a plurality of previous pixels corresponding to the pixels. The combined filtering and residual computation module computes, for each pixel of the pixels, a similarity term for bilateral filtering using the previous pixels and applies recursive bilateral filtering to each pixel using the similarity term to provide filtered pixels.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
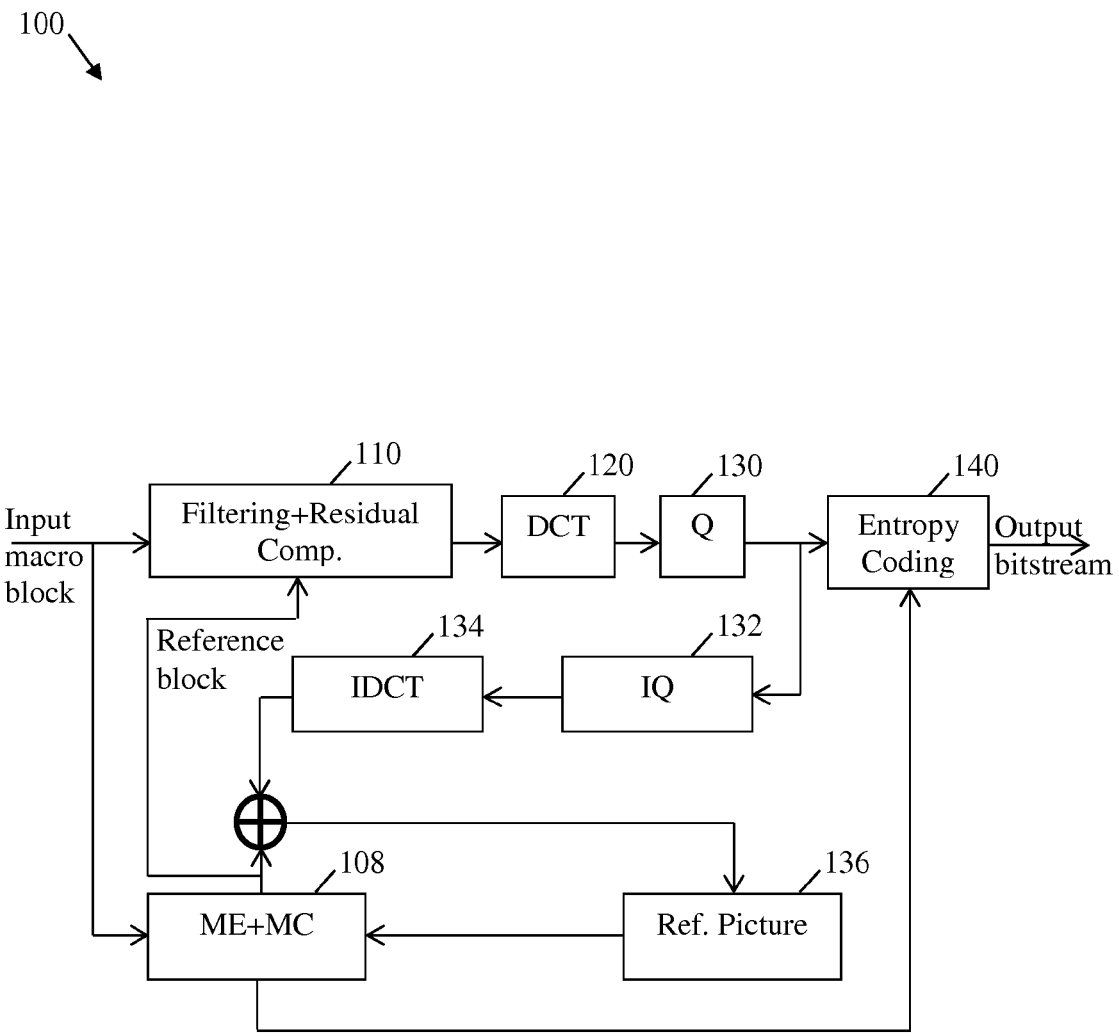
FIG. 1 illustrates an embodiment of an encoder with integrated denoising and bilateral filter functions.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Traditional temporal or spatiotemporal denoising algorithms can be computationally expensive due to the requirement of motion compensation. Recently, there have been proposals to integrate noise cancellation or reduction algorithms, also referred to as denoising algorithms, into the video encoding process so that computation cost can be reduced significantly. For example, in one proposal, the denoising function is realized by shrinking noisy discrete cosine transform (DCT) coefficients, but the temporal redundancy is not utilized. Therefore, the quality of the output may not be comparable with those of spatiotemporal algorithms. In another approach, an adaptive transform domain temporal filter is proposed for encoder-integrated denoising. However, the temporal filter is directly applied to transformed DCT coefficients, which may need additional processing because they are not available for P and B video frames in a compressed stream. In other Least Mean Square Error (LMSE) approaches, optimal recursive encoder-integrated filters are constructed to reduce noise based on an additive noise model. However, the optimal filters may no longer be optimal if the statistics of the noise signal are not stationary across space and time and can result in blurring edges and other artifacts. A bilateral filter has also been proposed which has been effective in preserving edges and avoiding unnatural artifacts.

System, method, and apparatus embodiments are provided herein to achieve video or image sequence encoding with an improved denoising algorithm that is both significantly efficient computationally and has an acceptable or reduced overhead cost, e.g., in comparison to the approaches above or other current denoising schemes for video or image sequence encoding. The embodiments include using recursive bilateral filtering as part of the denoising algorithm or scheme, which is integrated into a video encoder to overcome the limitations of the above or other current encoder-integrated denoising algorithms. The resulting encoder with integrated video (or image sequence) denoising and recursive bilateral filtering can reduce noise effectively and efficiently without substantial computation overhead.

To create a new filter that handles the above mentioned limitations, a temporal recursive filter design is analyzed. The filter can be converted to a temporal recursive bilateral filter by incorporating a bilateral similarity term. The temporal recursive filter can be extended to a spatiotemporal filter to further improve the denoising performance. The recursive filter can further be integrated into a video or image sequence encoder. The details of such design are presented in detail below.

A temporal recursive filter that uses at least two consecutive frames for filtering, such as a 2-tap temporal recursive filter, can be considered. Assume, for instance, that the frame for denoising processing in a video or image sequence is I(t), and its previous frame is I(t−1). Further, a pixel p in I(t) has a pixel value I(t,p), and its corresponding collocated pixel by motion estimation in I(t−1) is $p_{t-1}$ with pixel value I(t−1,$p_{t-1}$). The collocated pixel p and $p_{t-1}$ are connected by a motion vector v estimated by motion estimation, e.g., p=$p_{t-1}$+v(p), where v(p) is the motion vector at the pixel p. Using the 2-tap temporal recursive filter, the filtered pixel value $I_f$(t,p) is obtained as:

$$I_f(t,p)=wI(t,p)+(1-w)I_f(t-1,p_{t-1}) \quad (1)$$

where w is the filter coefficient that satisfies 0≤w≤1, and $I_f$(t−1,$p_{t-1}$) is the filtered video or image frame at t−1. Assuming the filter coefficient w does not change over time, it can be shown that this filter is equivalent to a causal exponentially decaying temporal non-recursive filter with filter size t.

The above constructed filter is a non-adaptive filter that has the same filter kernel for all pixels in a video or image frame for processing since the filter coefficient w is constant over time. There are two limitations associated with such a non-adaptive filter. First, it may result in a blurring effect on the pixels around edges since edge pixels are treated the same as those in flat regions. Second, it is susceptible to motion estimation errors and pixel misalignments. Undesired artifacts may be present due to the use of misaligned pixels to perform filtering.

In order to resolve these limitations, adaptive filters can be constructed to preserve the local true signal and reject unreliable samples. One solution is using a robust estimation (RE) filter, which has the capability of solving the two issues above using the robust statistics principle to reject unreliable samples for the filtering operation. However, the RE filter has a high computation complexity because it uses an iterative algorithm. Another simpler method is using a bilateral filter, which downweights the unreliable input samples using a similarity term in the filter kernel. The bilateral filter can be considered a RE filter with only one iteration. Using the same rationale behind the RE filter and bilateral filter, a similarity term is introduced into the temporal recursive filter of equation (1). The 2-tap temporal recursive filter is modified as:

$$I_f(t,p)=C(t,p)^{-1}(wI(t,p)+(1-w)S(p,p_{t-1})I_f(t-1,p_{t-1})), \quad (2)$$

where S(p,$p_{t-1}$) is the pixel similarity term similar to that used in a bilateral filter, which can be set as a Gaussian function with variance parameter $\sigma_S$ as:

$$S(p,p_{t-1}) = \exp\left(\frac{-\|I(t,p)-I(t-1,p_{t-1})\|^2}{2\sigma_s^3}\right), \quad (3)$$

C(t,p) is a normalization term to conserve pixel energy as follows:

$$C(t,p)=w+(1-w)S(p,p_{t-1}). \quad (4)$$

The bilateral temporal recursive filter described above can be further extended to a spatiotemporal recursive filter, where the spatial neighboring pixels of the pixel in processing are also taken into account to further improve the filter performance. The spatiotemporal bilateral recursive filter is constructed as:

$$I_f(t,p)=C(t,p)^{-1}(wI'(t,p)+(1-w)S(p,p_{t-1})I'_f(t-1,p_{t-1})), \quad (5)$$

where I'(t,p) and $I'_f$(t−1,$p_{t-1}$) are spatial filtered samples in the t and t−1 frames. These two samples can be obtained by bilateral filtering on spatial domain.

Although the above described temporal and spatiotemporal recursive filters can be applied as a preprocessing component for a video encoder, motion estimation has to be carried out before processing to align the pixels in time domain, which is a relatively expensive process computation wise (e.g., in terms of time and resources). The efficiency of the computation can be improved if the filters can be integrated into the video encoding pipeline. The motion estimation results by the video encoder can be reused by the denoising process, therefore motion estimation for denoising can be avoided.

The proposed 2-tap recursive bilateral filter described above is suited for integrating the filter into a block-based video or image sequence encoder, such as MPEG-2 or H.264 encoder. Such encoder can be implemented via software, for example. Hardware implementation or both combined software and hardware implementations can also be used. However, software based implementations may have lower cost. Since the 2-tap recursive bilateral filter can use two consecutive frames (at a time), the reconstructed reference frame in the video encoder and the current frame in processing are sufficient for the filter input. Typically, motion estimation in an encoder is block-based and may be sometimes inaccurate. The robustness nature of the bilateral filter means that the unreliable input pixels caused by pixel misalignment can be downweighted (or scaled down) to reduce their impacts on the filtering process.

FIG. 1 shows an embodiment of an encoder 100 with integrated denoising and bilateral filter functions. The encoder 100 includes a recursive bilateral filter function 110, which is integrated as a module (e.g., software module) after a motion estimation (ME) and motion capture (MC) function 108 and before a DCT transform function 120. The introduced filtering module can also be combined with a residual computation module. Thus, a combined filtering and residual computation function 110 can also be used. Motion estimation (in function 108) is completed before filtering (in function 110). Thus, the input macro block to function 110 is matched with a macro block in the reference frame (referred to as reference macro block) from function 108. Each pixel p in the input macro block is aligned with a co-located pixel $p_{t-1}$ in the reference macro block in the reconstructed reference picture. If only temporal filtering is used, then equation (1) can be used to calculate the filtered pixel value, where I(t,p) is the pixel value of the pixel p in the input macro block, and $I_f(t-1;p_{t-1})$ is the pixel value of the pixel $p_{t-1}$ in the reference macro block. Due to quantization, the reconstructed pixel value is an approximation to the true $I_f(t-1;p_{t-1})$, which is supposed to be obtained from original video or image frames without compression. However, such degradation is tolerable for the filtering process and is considered a trade-off for integrating the filter into the encoder framework. Alternatively, for spatiotemporal filtering, the equation (3) can be used where I'(t,p) is calculated by applying, for example, a spatial bilateral filter with 3×3 filter kernel within the block in the current frame. The value $I_f'(t-1;p_{t-1})$ is calculated by applying a spatial bilateral filter with 3×3 filter kernel within the reference block in the reconstructed reference frame. The encoder 100 includes further functions or modules 130 (Quantization (Q)), 132 (Inverse Quantization (IQ)), 134 (inverse discrete cosine transform (IDCT)), 136 (reference picture generator), and 140 (entropy coding). These functions or modules can be configured typically as in current or available encoders. The components of encoder 100 can be arranged as shown in FIG. 1 or in any other suitable arrangement. The recursive bilateral filtering is achieved by the looping or feedback across the different components as shown in FIG. 1.

In practical implementation of the encoder 100, e.g., for H.264 and MPEG-2, some macro blocks can be encoded as an I mode without motion estimation or intra-prediction. For those blocks, a spatial only bilateral filter can be applied to reduce noise. In addition, for an H.264 encoder, a macro block can be encoded either as intra-mode or inter-mode if it is not encoded as an I block. For the intra-mode, the "reference block" is generated by the encoder by interpolation using the boundary pixels of the neighboring blocks to the current macro block, which sometimes may have little similarity in appearance to the current encoding macro block. However, experiments using an encoder design with integrated denoising and bilateral filter functions (such as the encoder 100) show that using such unreliable intra-mode reference blocks as filter input can still result in positive peak signal-to-noise ratio (PSNR) gains comparing to skipping these intra-mode blocks without filtering.

Figure 2:
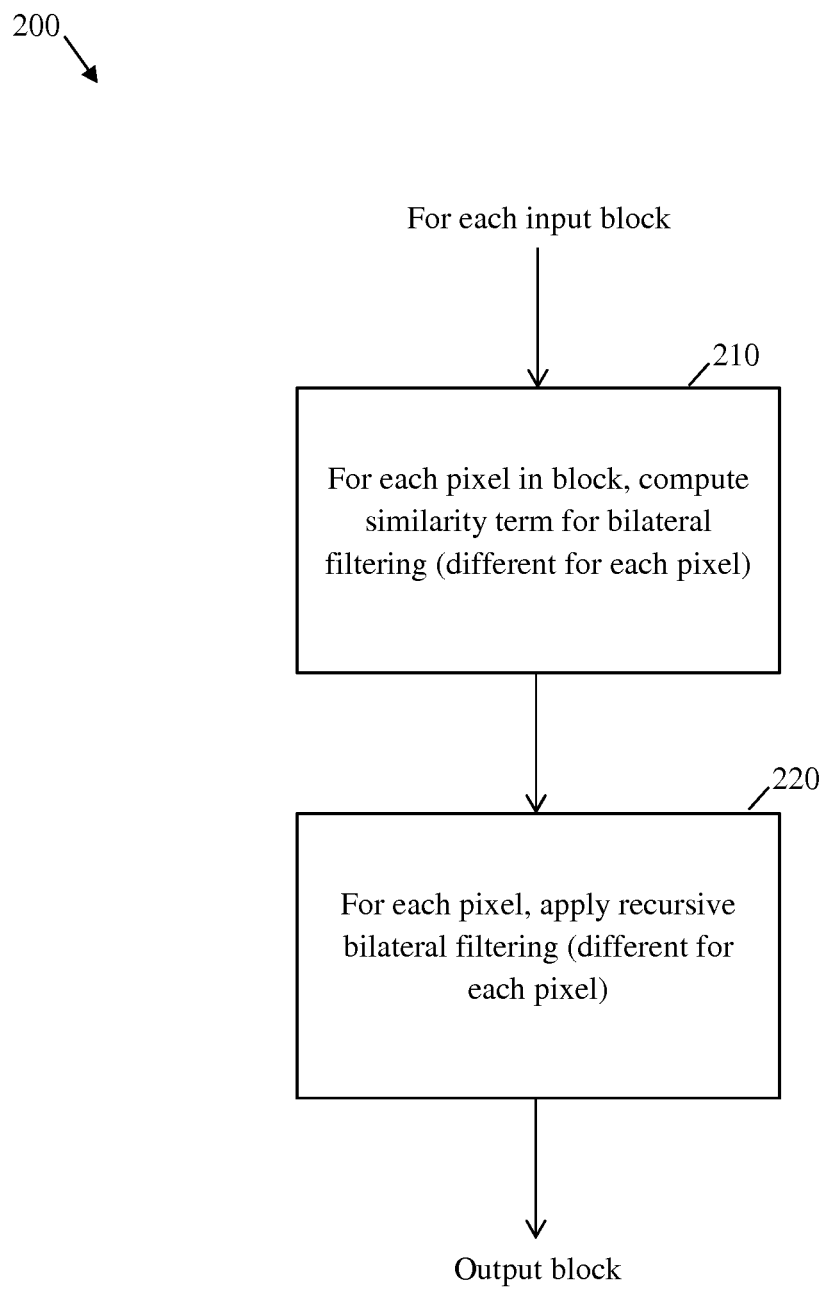
FIG. 2 illustrates an embodiment of a method for encoder-integrated denoising and recursive bilateral filtering.

FIG. 2 shows an embodiment of a method 200 for encoder-integrated denoising and recursive bilateral filtering. For instance, the method 200 can be implemented using the encoder 100, at least partly in the recursive bilateral filter and residual computation function 110. In comparison to LMSE filters that require accurate filter parameter estimation and lack signal adaptation within coding blocks, the method 200 has better signal adaptation within coding blocks and is more robust to encoder motion estimation errors. The method 200 includes steps for processing each pixel in an input block. At step 210 of the method 200, a similarity term for bilateral filtering is computed for each pixel in the block. The similarity term is computed for each current pixel of the pixels in a current frame and corresponding previous pixel of the pixels in the previous frame. At step 220, recursive bilateral filtering is applied for each pixel. Each pixel may have different filtering parameters and results. Bilateral filtering is applied recursively to the current pixel using the similarity term. Thus, different pixels can have different computed similarity terms. The pixels can be processed in the method 200 in parallel (at about the same time) or in sequence, for example at the recursive bilateral filter and residual computation function 110.

Figure 3:
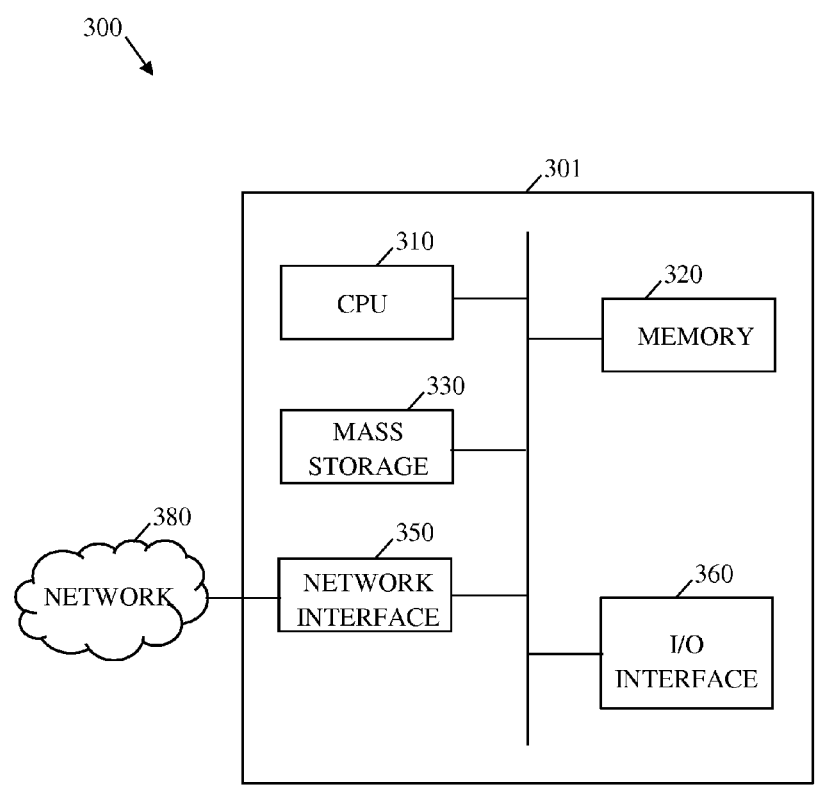
FIG. 3 is a diagram of a processing system that can be used to implement various embodiments.

FIG. 3 is a block diagram of a processing system 300 that can be used to implement various embodiments. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 300 may comprise a processing unit 301 equipped with one or more input/output devices, such as a network interfaces, storage interfaces, and the like. The processing unit 301 may include a central processing unit (CPU) 310, a memory 320, a mass storage device 330, and an I/O interface 360 connected to a bus. The bus may be one or more of any type of several bus architectures including a memory bus or memory controller, a peripheral bus or the like.

The CPU 310 may comprise any type of electronic data processor. The memory 320 may comprise any type of system memory such as static random access memory (SRAM), dynamic random access memory (DRAM), synchronous DRAM (SDRAM), read-only memory (ROM), a combination thereof, or the like. In an embodiment, the memory 320 may include ROM for use at boot-up, and DRAM for program and data storage for use while executing programs. In embodiments, the memory 320 is non-transitory. The mass storage device 330 may comprise any type of storage device configured to store data, programs, and other information and to make the data, programs, and other information accessible via the bus. The mass storage device 330 may comprise, for example, one or more of a solid state drive, hard disk drive, a magnetic disk drive, an optical disk drive, or the like.

The processing unit 301 also includes one or more network interfaces 350, which may comprise wired links, such as an Ethernet cable or the like, and/or wireless links to access nodes or one or more networks 380. The network interface 350 allows the processing unit 301 to communicate with remote units via the networks 380. For example, the network interface 350 may provide wireless communication via one or more transmitters/transmit antennas and one or more receivers/receive antennas. In an embodiment, the processing unit 301 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for removing noise in a video or image sequence, the method comprising:
   receiving, at an encoder, a current frame comprising a plurality of current pixels and a previous frame comprising a plurality of previous pixels corresponding to the current pixels, the previous pixels being temporally aligned with the current pixels according to motion estimation;

computing, for each current pixel of the current pixels, a similarity term for temporal bilateral filtering using the previous pixels and the current pixels, the temporal bilateral filtering including reliability based weighting of input samples using the similarity term;

reconstructing, at the encoder, a reference frame corresponding to the previous frame, the reference frame comprising a plurality of first filtered pixels spatially corresponding to the previous pixels, the plurality of first filtered pixels produced in a previous noise removal operation;

determining, for each current pixel of the current pixels, a current spatial filtered sample from neighboring pixels of the current pixel, the current spatial filtered sample determined using a first spatial bilateral filter with a filter kernel within the plurality of current pixels;

determining, for each current pixel of the current pixels, a previous spatial filtered sample temporally corresponding to the current spatial filtered sample, the previous spatial filtered sample determined using a second spatial bilateral filter with a filter kernel within the plurality of first filtered pixels;

applying the temporal bilateral filtering to each current pixel to produce second filtered pixels, the temporal bilateral filtering using, for each current pixel, the similarity term, the current spatial filtered sample, and the previous spatial filtered sample; and storing the second filtered pixels for a subsequent noise removal operation.

2. The method of claim 1, wherein applying temporal bilateral filter to each current pixel comprises applying both recursive filtering and bilateral filtering to each current pixel, wherein coefficients for applying the recursive bilateral filter are computed by calculating similarities of temporally aligned pixels in the current frame and an aligned frame corresponding to the current frame, and wherein results of applying the recursive bilateral filter are obtained using the temporally aligned pixels in the current frame and the aligned frame.

3. The method of claim 2, wherein the temporally aligned pixels in the current frame are temporally aligned using motion estimation at the encoder at an encoding macro block level as part of a combined motion estimation and motion compensation process, and wherein the motion estimation aligns a macro block at the current frame to an image block in the reference frame.

4. The method of claim 2, wherein the similarities of the temporally aligned pixels are calculated by calculating pixel value differences and using a Gaussian function to generate similarity values.

5. The method of claim 1, wherein the current frame includes one or more macro blocks, and wherein the similarity term is computed and the temporal bilateral filter is applied for each current pixel in the one or more macro blocks.

6. The method of claim 5, wherein the temporal bilateral filter is integrated with a residual computation function, and wherein the integrated temporal bilateral filter and the residual computation function are implemented after completing motion estimation and compensation and before a discrete cosine transform (DCT) at the encoder.

7. The method of claim 5, wherein, for any macro blocks encoded as an I macro block in the current frame, a spatial bilateral filter without temporal filtering is applied in the temporal bilateral filter to reduce noise.

8. The method of claim 5, wherein, for any macro blocks encoded according to intra-prediction mode in the current frame, a reference block for the temporal bilateral filter is generated by interpolating boundary pixels of neighboring macro blocks.

9. The method of claim 5, wherein the temporal bilateral filter is a spatiotemporal recursive bilateral filter that takes into account spatial neighboring pixels of each current pixel.

10. The method of claim 1, wherein the temporal bilateral filter is applied as a recursive function using software.

11. At a network device, a method for removing noise in a video or image sequence, the method comprising:

receiving, at a filtering and residual computation function, a plurality of macro blocks in a video or image sequence and a plurality of previous blocks corresponding to the macro blocks, the macro blocks each comprising a plurality of pixels, the previous blocks each comprising a plurality of previous pixels corresponding to respective pixels of the macro blocks;

reconstructing, at the filtering and residual computation function from a motion estimation function, a plurality of reference blocks, the reference blocks each comprising a plurality of reference pixels corresponding to respective pixels of the macro blocks, each of the reference pixels filtered in a previous filtering operation;

computing, at the filtering and residual computation function, a similarity term for each of the pixels of the macro blocks using a corresponding pixel of the previous blocks;

computing, at the filtering and residual computation function, a current spatial filtered sample and a previous spatial filtered sample for each of the pixels of the macro blocks, the current spatial filtered sample computed using a first spatial bilateral filter with neighboring pixels in the macro blocks, the previous spatial filtered sample computed using a second spatial bilateral filter with corresponding pixels of the reference blocks for each of the neighboring pixels; and filtering, with a temporal bilateral filter function, each pixel of the pixels of the macro blocks with temporal bilateral filtering, the temporal bilateral filtering for each pixel using the similarity term, the current spatial filtered sample, and the previous spatial filtered sample for each pixel, the temporal bilateral filtering including reliability based weighting of input samples using the similarity term.

12. The method of claim 11, wherein the temporal bilateral filter function is a 2-tap temporal filter function that calculates a filtered value for each of the pixels at a time interval using a predetermined filter coefficient and another value for a corresponding pixel received at a preceding time interval.

13. The method of claim 12, wherein the 2-tap temporal filter function is modified to include a similarity term used for bilateral filtering.

14. The method of claim 13, wherein the similarity term is a Gaussian function with a predetermined variance.

15. The method of claim 13, wherein the 2-tap temporal filter function is extended to a spatiotemporal recursive filter that uses for computation one or more spatial neighboring pixels of each of the pixels of the macro block.

16. The method of claim 11, wherein the pixels are processed in parallel or at about the same time using the temporal bilateral filter function.

17. The method of claim 11, wherein both the filtering and residual computation function and the motion estimation function are implemented via software at an encoder.

18. An apparatus for removing noise in a video or image sequence, the apparatus comprising:
- a processor; and
- a computer readable storage medium storing programming for execution by the processor, the programming including instructions to:
  - apply, as part of an encoding for video or image sequence, combined filtering and residual computation for a current frame comprising a plurality of current pixels and a previous frame comprising a plurality of previous pixels corresponding to the current pixels;
  - reconstruct a reference frame comprising a plurality of reference pixels, each of the reference pixels corresponding to a current pixel of the current pixels, each of the reference pixels being filtered;
  - compute, for each current pixel of the current pixels, a similarity term for temporal bilateral filtering using a previous pixel of the previous pixels corresponding to the current pixel, the temporal bilateral filtering including reliability based weighting of input samples using the similarity term;
  - determine, for each current pixel of the current pixels, a current spatial filtered sample from neighboring pixels of the current pixel, the current spatial filtered sample determined using a first spatial bilateral filter with a filter kernel within the plurality of current pixels;
  - determine, for each current pixel of the current pixels, a previous spatial filtered sample temporally corresponding to the current spatial filtered sample, the previous spatial filtered sample determined using a second spatial bilateral filter with a filter kernel within the plurality of reference pixels; and
  - apply the temporal bilateral filtering to each current pixel of the current pixels using the similarity term for the current pixel, the current spatial filtered sample for the current pixel, and the previous spatial filtered sample for the current pixel to provide filtered pixels.

19. The apparatus of claim 18, wherein the reference frame is reconstructed using motion estimation and motion compensation of the encoding.

20. The apparatus of claim 18, wherein the programming includes further instructions to forward the filtered pixels to a discrete cosine transform (DCT) of the encoding after applying the temporal bilateral filtering.

21. The apparatus of claim 18, wherein applying temporal bilateral filtering to each pixel comprises applying both recursive filtering and bilateral filtering to each pixel, wherein coefficients for applying the recursive bilateral filtering are computed by calculating similarities of temporally aligned pixels in the current frame and an aligned frame corresponding to the current frame, and wherein results of applying the recursive bilateral filtering are obtained using the temporally aligned pixels in the current frame and the aligned frame.

22. The apparatus of claim 21, wherein the temporally aligned pixels in the current frame are temporally aligned using motion estimation at an encoding macro block level as part of a combined motion estimation and motion compensation process, and wherein the motion estimation aligns a macro block at the current frame to an image block in the reference frame.

23. The apparatus of claim 18, wherein the programming includes further instructions to implement a temporal or spatiotemporal bilateral filter operation to apply the temporal bilateral filtering.

24. The method of claim 1, wherein the current spatial filtered sample is determined using a spatial bilateral filter with a 3×3 filter kernel, and wherein the previous spatial filtered sample is determined using spatial bilateral filter with a 3×3 filter kernel.

* * * * *

UNITED STATES PATENT AND TRADEMARK OFFICE
CERTIFICATE OF CORRECTION

| | | |
|---|---|---|
| PATENT NO. | : 9,641,729 B2 | Page 1 of 1 |
| APPLICATION NO. | : 13/871965 | |
| DATED | : May 2, 2017 | |
| INVENTOR(S) | : Dong-Qing Zhang | |

It is certified that error appears in the above-identified patent and that said Letters Patent is hereby corrected as shown below:

In the Claims

In Column 8, Line 48, Claim 12, delete "temporal filter" and insert --temporal recursive filter--.

In Column 8, Line 53-54, Claim 13, delete "temporal filter" and insert --temporal recursive filter--.

In Column 8, Line 58-59, Claim 15, delete "temporal filter" and insert --temporal recursive filter--.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*